(12) United States Patent
Ventura

(10) Patent No.: US 11,163,936 B2
(45) Date of Patent: *Nov. 2, 2021

(54) INTERACTIVE VIRTUAL CONVERSATION INTERFACE SYSTEMS AND METHODS

(71) Applicant: noHold, Inc., Milpitas, CA (US)

(72) Inventor: Diego Ventura, Milpitas, CA (US)

(73) Assignee: noHold, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,375

(22) Filed: May 7, 2020

(65) Prior Publication Data

US 2020/0304433 A1  Sep. 24, 2020

Related U.S. Application Data

(63) Continuation of application No. 15/721,545, filed on Sep. 29, 2017, now Pat. No. 10,659,398.

(60) Provisional application No. 62/496,024, filed on Oct. 3, 2016.

(51) Int. Cl.
| | |
|---|---|
| G06F 40/143 | (2020.01) |
| H04L 12/58 | (2006.01) |
| G06F 16/93 | (2019.01) |
| G06F 16/332 | (2019.01) |
| G06F 16/33 | (2019.01) |
| G06F 40/237 | (2020.01) |

(52) U.S. Cl.
CPC ........ *G06F 40/143* (2020.01); *G06F 16/3329* (2019.01); *G06F 16/3344* (2019.01); *G06F 16/93* (2019.01); *G06F 40/237* (2020.01); *H04L 51/00* (2013.01); *H04L 51/02* (2013.01); *H04L 51/16* (2013.01)

(58) Field of Classification Search
CPC .. G06F 40/143; G06F 40/237; G06F 16/3329; G06F 16/3344; H04L 51/02; H04L 51/16; H04L 51/00
USPC ........................................................ 709/203
See application file for complete search history.

(56) References Cited

U.S. PATENT DOCUMENTS

| | | | |
|---|---|---|---|
| 6,604,141 | B1 | 8/2003 | Ventura |
| 8,239,362 | B1 * | 8/2012 | Frazier ................... G06Q 10/00 707/706 |
| 9,223,537 | B2 | 12/2015 | Brown et al. |
| 10,417,567 | B1 | 9/2019 | Miller et al. |
| 10,546,001 | B1 | 1/2020 | Nguyen et al. |
| 10,659,398 | B2 | 5/2020 | Ventura |
| 2004/0220850 | A1 | 11/2004 | Ferrer et al. |
| 2006/0253410 | A1 | 11/2006 | Nayak et al. |
| 2007/0192474 | A1 | 8/2007 | Decasper et al. |

(Continued)

*Primary Examiner* — Meng Vang
(74) *Attorney, Agent, or Firm* — Carr & Ferrell LLP

(57) ABSTRACT

Interactive virtual conversation interfaces are provided herein. An example method includes receiving a digital document that has textual information, utilizing one or more forms natural language processing of the digital document, based on the nature of the digital document, to ascertain a hierarchical structure of the plain textual information, and determine topics within the plain textual information, generating a tree structure based on relationships between topics of the plain textual information, wherein the topics are arranged into the tree structure, and generating a virtual conversation interface that receives queries and presents responses to the queries using the tree structure.

20 Claims, 7 Drawing Sheets

(56) References Cited

U.S. PATENT DOCUMENTS

| | | | |
|---|---|---|---|
| 2009/0055190 A1* | 2/2009 | Filev | G01C 21/3608 |
| | | | 704/270 |
| 2009/0216735 A1* | 8/2009 | Dexter | G06F 16/955 |
| 2012/0084293 A1* | 4/2012 | Brown | G06F 16/532 |
| | | | 707/741 |
| 2012/0221854 A1 | 8/2012 | Orsini et al. | |
| 2014/0136519 A1 | 5/2014 | Latzina et al. | |
| 2015/0019216 A1 | 1/2015 | Singh et al. | |
| 2015/0185996 A1 | 7/2015 | Brown et al. | |
| 2015/0310005 A1 | 10/2015 | Ryger et al. | |
| 2016/0239487 A1 | 8/2016 | Potharaju et al. | |
| 2017/0116260 A1 | 4/2017 | Chattopadhyay | |
| 2017/0242886 A1 | 8/2017 | Jolley et al. | |
| 2018/0032576 A1 | 2/2018 | Romero | |
| 2018/0097749 A1 | 4/2018 | Ventura | |
| 2018/0366118 A1 | 12/2018 | Lovitt et al. | |
| 2019/0130026 A1 | 5/2019 | Ventura | |

* cited by examiner

```
<sentence id="57_181">
  <keywords>
  paid 08 time 08 employe complet 08 request 08 time 08 employe complet 08 form found 08 intranet 08 xxxxxx
  </keywords>
  <parsetree>
  (TOP (S (S (VP (TO to) (VP (VB be) (VP (VBN paid) (PP (IN for) (NP (NN TIME) (RB off)))))) (,,) (NP (DT an) (NN employe)) (VP (MD must) (VP (VB complet) (NP (DT a) (NN request)) (PP (IN for) (NP (NN time))) (PP (IN off) (NP (NP (NN form)) (SBAR (WHNP (WDT which)) (S (VP (MD can) (VP (VB be) (VP (VBN found) (PP (IN on) (NP (DT the) (NN intranet))) PP (IN at) (NP (NNP xxxxxxx))))))))))) (..)))
  </parsetree>
</sentence>
```

FIG. 5

INTERACTIVE VIRTUAL CONVERSATION INTERFACE SYSTEMS AND METHODS

CROSS REFERENCE TO RELATED APPLICATIONS

This application is a continuation of and claims the priority benefit of U.S. Non-Provisional application Ser. No. 15/721,545, filed on Sep. 29, 2017, titled, "Interactive Virtual Conversation Interface Systems and Methods," which is a non-provisional application that claims the benefit and priority of U.S. Provisional Application Ser. No. 62/496,024, filed on Oct. 3, 2016, all of which are hereby incorporated by reference herein in their entireties including all references and appendices cited therein.

FIELD OF THE TECHNOLOGY

The present technology relates generally to virtual conversation interfaces such as chat-bots, and, more particularly, to systems and methods that create interactive virtual conversation interfaces.

SUMMARY OF THE PRESENT TECHNOLOGY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for generating a virtual conversation interface, the method including: receiving a digital document that includes plain textual information; utilizing natural language processing of the digital document to: ascertain a hierarchical structure of the textual information; and determine topics within the textual information. The method also includes generating a tree structure based on relationships between topics of the textual information, where the topics are arranged into the tree structure. The method also includes generating a virtual conversation interface that receives queries and presents responses to the queries using the tree structure. Other embodiments of this aspect include corresponding computer systems, apparatus, and computer programs recorded on one or more computer storage devices, each configured to perform the actions of the methods.

Implementations may include one or more of the following features. The method further including generating digital signatures for the topics, where the tree structure includes the digital signatures. In some embodiments, the hierarchical structure includes a layout of the digital document. In some embodiments, method further includes performing backward and forward chaining of digital signatures within the hierarchical structure, the backward and forward chaining allowing for dialogue with a user, where the responses are generated based on successive queries about the same topic. In some embodiments, method further includes: receiving a query from a user through a virtual conversation interface; parsing the query with the natural language processing to identify query topics; searching the tree structure for digital signatures that correspond to at least a portion of the query topics; generating a response to the query, the response including the textual information associated with the digital signatures that correspond to at least a portion of the query topics. In some embodiments, if the queries are directed to the same topic, but the queries are stated using different expressions, the method further includes performing syntactic learning so as to return the same digital signature of digital signatures for these queries having different expressions. In some embodiments, if a type of natural language processing utilized is based on attribute of the digital document. In some embodiments, the response is generated using third party data obtained from third party data sources, in addition to the digital document. In some embodiments, where the digital document is an unstructured document, and the natural language processing utilized is statistical. In some embodiments, where the digital document is a structured document, and the natural language processing utilized is symbolic. Implementations of the described techniques may include hardware, a method or process, or computer software on a computer-accessible medium.

One general aspect includes a system for generating an interactive virtual conversation interface, the system including: a processor; and a memory for storing executable instructions, the processor executing the instructions to: generate an interactive virtual conversation interface by: receiving a digital document that includes plain textual information; utilizing natural language processing of the digital document to: ascertain a hierarchical structure of the textual information; determine topics within the textual information; and generating a tree structure based on relationships between topics of the textual information, where the topics are arranged into the tree structure; and provide a virtual conversation interface that: receives queries; and presents responses to the queries using the tree structure. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 5 illustrates example signature(s) generated from the document of FIG. 4 and convert the same into an interactive conversational interface.

DETAILED DESCRIPTION

Figure 1:
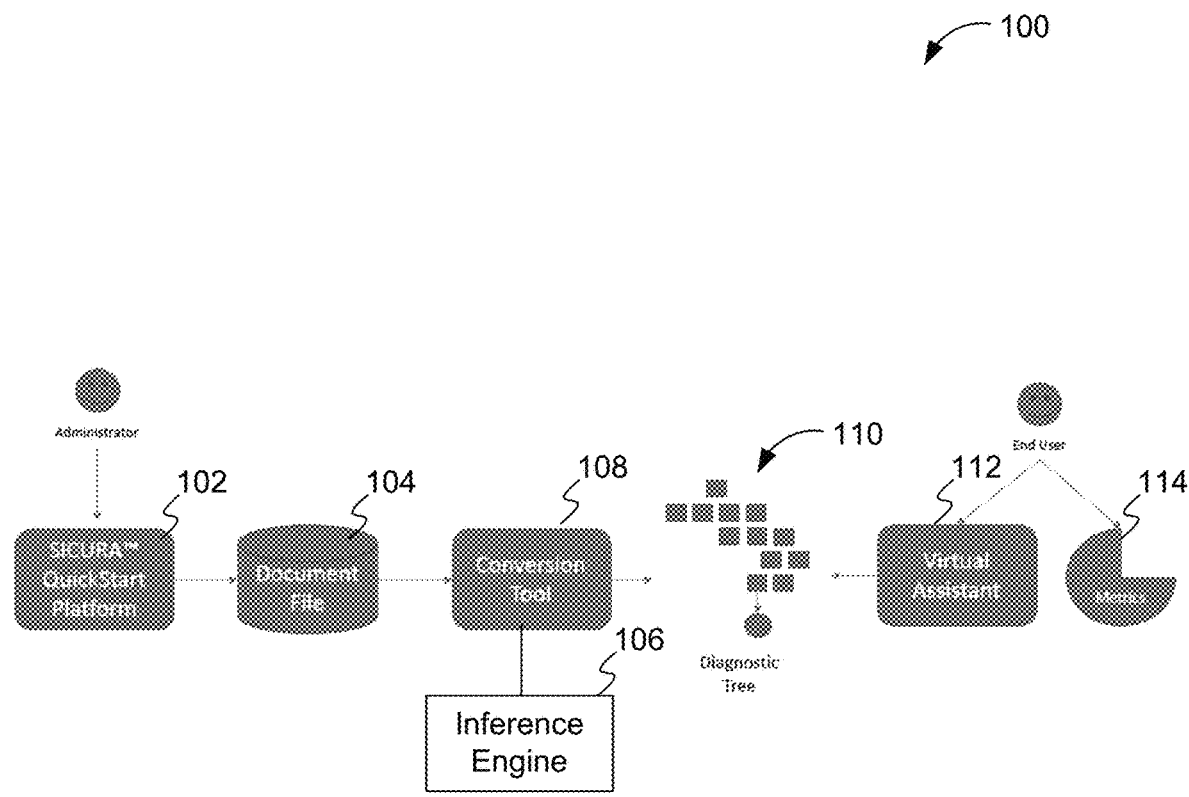
FIG. 1 is schematic diagram of an example system and workflow constructed in accordance with the present disclosure.

Generally speaking, the present disclosure is directed to virtual conversation interfaces such as chatbots, and, more particularly, to systems and methods that create interactive virtual conversation interfaces.

In some embodiments, a method for creating an interactive virtual interface such as a virtual assistant automatically using one or more digital documents as a basis for educating and/or training the interface is provided herein. This training effectively allows the interface to be utilized as a tool to generate responses for queries on particular topics. By way of example, the systems and methods herein can ingest one or more technical documents related to a product or service. The documents are processed to create a query structure that allows for topics in the documents to be accessed and served as responses to queries provided to the interface by a user.

It will be understood that a virtual assistant (VA) is a web-based application based on artificial intelligence (AI) that allows end users to ask questions in a natural language and provides answers automatically without human intervention. Example exchanges can include a question and an answer, and other examples can include a dialog where the end user may change subject, ask clarifying questions, or follow a procedure—just to name a few. Stated otherwise, some embodiments allow for these interfaces to be interactive based on consumption and processing of knowledge extracted from one or more digital documents.

The functionality of the VA is based, in part, on the type of digital documents and/or third party sources available, as well as the type of document processing performed on the available data. Systems and methods disclosed herein can be configured to process both structured and/or unstructured documents, as will be discussed in greater detail herein.

Systems and methods disclosed herein provide tools to select one or more digital documents and upload them into a system where the document(s) is processed. A specifically programmed interactive virtual interface is launched and metrics about its activity are tracked. In some embodiments, an administrator can publish the interface through different channels including voice, messaging systems, collaboration platforms, and so forth.

The systems and methods disclosed herein provide a clear departure from existing Artificial Intelligence solutions that typically require construction of a knowledge base in a particular format. Advantageously, the present disclosure provides systems and methods that can ingest and create a VA through the assimilation of a digital document that was not designed for use in creating a VA. Example use cases in social and business arenas are provided for the purpose of providing context. VAs are created in accordance with the present disclosure that can answer questions about, for example, presidential executive orders to help with democratization of information. A user can visit White House site, download the latest official Presidential Executive Order and ingest the same into the system. End users can ask questions about the Order without having to read it in its entirety. Because the information provided by the VA is unaltered, it lacks political bias that would possible be interjected if processed by a human, and ensures the democratization of information sharing. The present disclosure can also be used to create VAs out of existing manuals, product manuals, employee manuals, companies' policies and procedures with the obvious benefit of reducing the cost of supporting those products or policies. The paradigm of creating a manual for a newly launched product is a well-established practice. Companies stand much to gain in being able to leverage the system to create a VA as a by-product of creating a manual for a new product. Companies can create interactive virtual conversation interfaces with minimal effort, providing a channel to answer questions about the new product. Also, the actionable customer metrics collected by the system can help the company identify potential problems with the product and new market opportunities.

FIG. 1 is a schematic diagram of an example system 100 and general flow through the system. The system 100 generally comprises a processor and memory for storing executable instructions. The executable instructions provide specific configurations that allow the system 100 to function as a particular-purpose computing device. The system 100 functions to ingest various types of data such as digital documents, and convert the same into a diagnostic or hierarchical tree. The tree is used as the basis for allowing interactive conversations (e.g., question and answer) between end users and an interactive virtual interface (e.g., VA) generated by the system 100 that is responsive based on the diagnostic or hierarchical tree. In particular, the system 100 can operate on both structured and unstructured documents. A structured document is a document that comprises a particular layout such as headings, paragraphs, headers, and other markers that designate the locations and types of topics/content that are included in the document. In these instances, the diagnostic or hierarchical tree is based at least partially on the structure determined from the document. For example, each major topic in a diagnostic technical manual may begin with a heading that describes the general topics of a given section of the document under that particular heading. The tree has individual branches based on these headings and topics. Under each of these branches are topics (leaves) that include more detailed information found in the textual content under each specific heading. This description is not intended to be limiting, but an example, of a document processing that can occur using the present disclosure. Specific headings or other features can be determined, for example, from XML information such as metadata tags or other document properties that are accessible in the document itself such as a table of contents. These features such as headings and body content can be determined from the layout of the document. For example, headings are often set off from body content by font size and so forth. In some embodiments, structured documents are processed using symbolic processing that includes, but is not limited to syntactic and/or semantic analyses.

The system 100 can also process unstructured documents that include, for example, only plain textual content that is not arranged into any particular format or layout. In some embodiments, the unstructured documents are processed using statistical analyses that include, for example, TD/IDF (term frequency-inverse document frequency) processes, or other similar processes that would be known to one of ordinary skill in the art with the present disclosure before them.

In general, the system 100 can be configured to use both machine learning and/or unsupervised learning to improve VA creation and implementation based on exchanges between VAs and end users and the tracking of metrics related to the accuracy of responses provided to the end users.

In general, the system 100 comprises a quick start platform 102 that provides GUIs that allow an administrator to utilize the features of the system 100. An administrator can input an electronic document(s) 104, which is transferred to a conversion module or tool 108. The conversion module or tool 108 converts the document into a diagnostic tree 110, using for example various natural language processing technologies (based on whether the document is structured or unstructured). The VA 112 is generated and provided for use. The VA 112 utilizes the diagnostic tree to provide responses to queries. Also, the system 100 gathers metrics 114 based on use of the VA 112.

In more detail, the conversion module 108 is configured to both convert the document into a diagnostic tree, but also to instantiate the VA into operation. With respect to conversion, the conversion module 108 scans an input document and determines a hierarchical structure based on different elements in the document. In some embodiments, an element in a document could include a topic or subject matter. This could also include information associated with a topic such as plain textual content, the position (location such as page or line) of the plain textual content within the document, and other attributes of the elements of a document that include plain text.

Each element (node in the diagnostic tree) is associated with a level of the hierarchical structure and stored in memory. In some embodiments, the system 100 can allow for backward and forward chaining algorithms through an inference engine 106. The inference engine 106 can be integrated into the conversion module 108 or can operate as a standalone module. The forward and backward chaining algorithms engage the moment the natural language processor (NLP) utilized by the system 100 has found a match between the end user query and one of the nodes in a diagnostic tree. This is referred to as forward and backward chaining because of the forward and backward (up and down) over the diagnostic tree that is used to find other known facts, meaning other nodes, which the end user is ready to confirm as being true. To confirm the validity of a node, the inference engine 106 engages the end user in a simulating conversation. For example if the end user says "the light is blinking" the NLP may find a node matching that information. Next the inference engine 106 and its forward and backward chaining algorithms try to find other pertinent nodes by asking the end user "are you experiencing disruption in connectivity?". The VA asks this questions because the diagnostic tree possesses a node one level above the one just confirmed with that information.

In some embodiments, the inference engine 106 can manage dialog with the end user without an administrator having to script permutations of the dialog between the VA and the end user.

An example of backward and forward chaining would include logical connections between elements in the document. For example, a linkage could exist between a header in the document and subsequent paragraphs located under this header. While each paragraph might include different information about aspects of the header topic, each could be linked directly to the header. Conceptually, the header would be a parent node in the diagnostic tree and each paragraph would fall under the node, but would be at the same level (horizontal) below the node that represents the header. If paragraphs build on content from other paragraphs, these paragraphs could be arranged in a vertical arrangement rather than horizontal. For example, if the header topic is automobile maintenance, paragraphs thereunder might involve engine, interior, exterior, and so forth. These paragraphs could be arranged generally as different nodes at the same horizontal level. Paragraphs related to engine maintenance could be tiered vertically under the engine maintenance node. This allows for the user to ask questions related to various levels of engine maintenance and receive responses from the VA. The VA can traverse the diagnostic tree to obtain plain textual content that relates to their query. In general, backward and forward chaining allow for dialogue with a user, where the responses are generated based on successive queries about the same topic or related topics.

Figure 4:
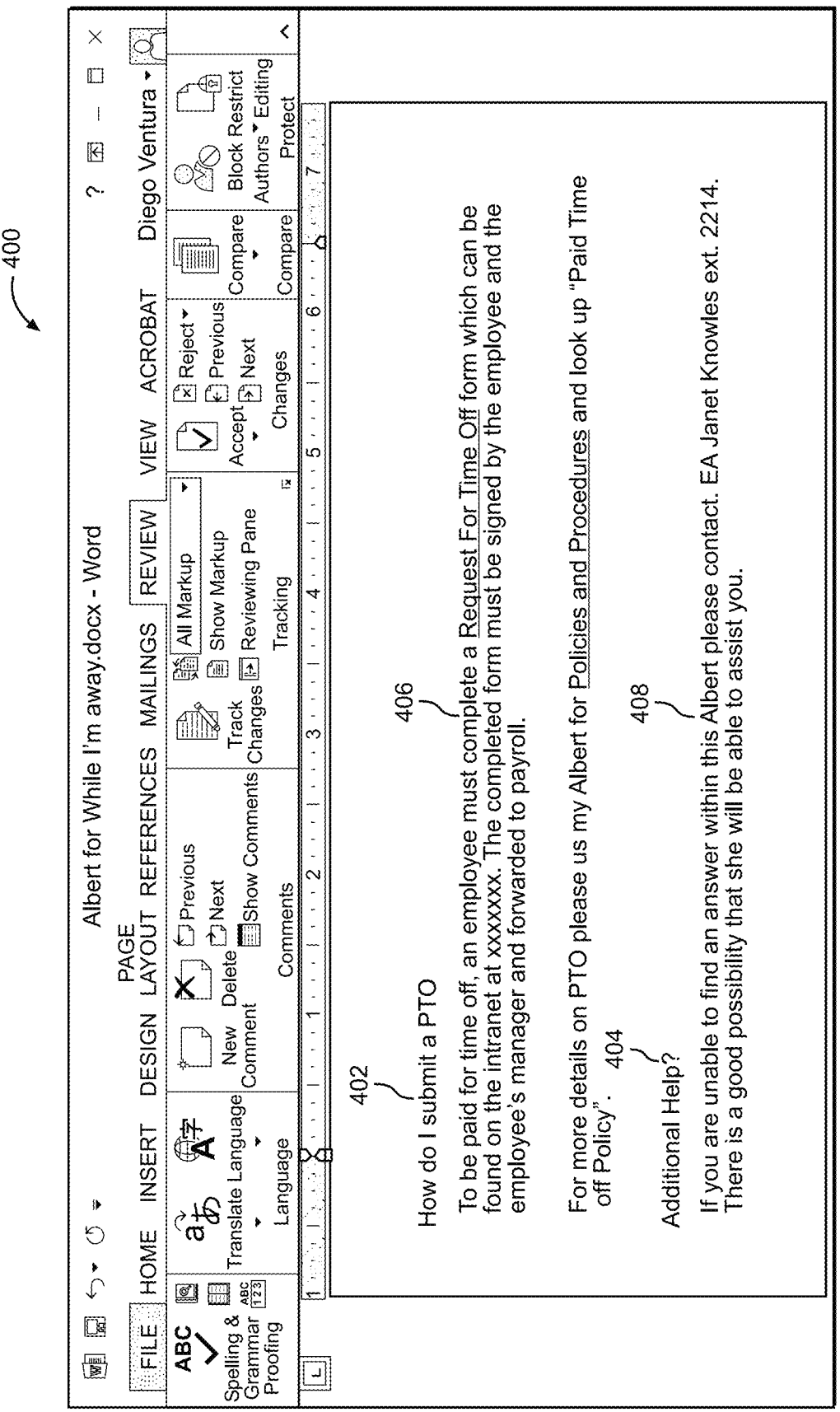
FIG. 4 is an example document used to create an interactive conversational interface.
Figure 6:
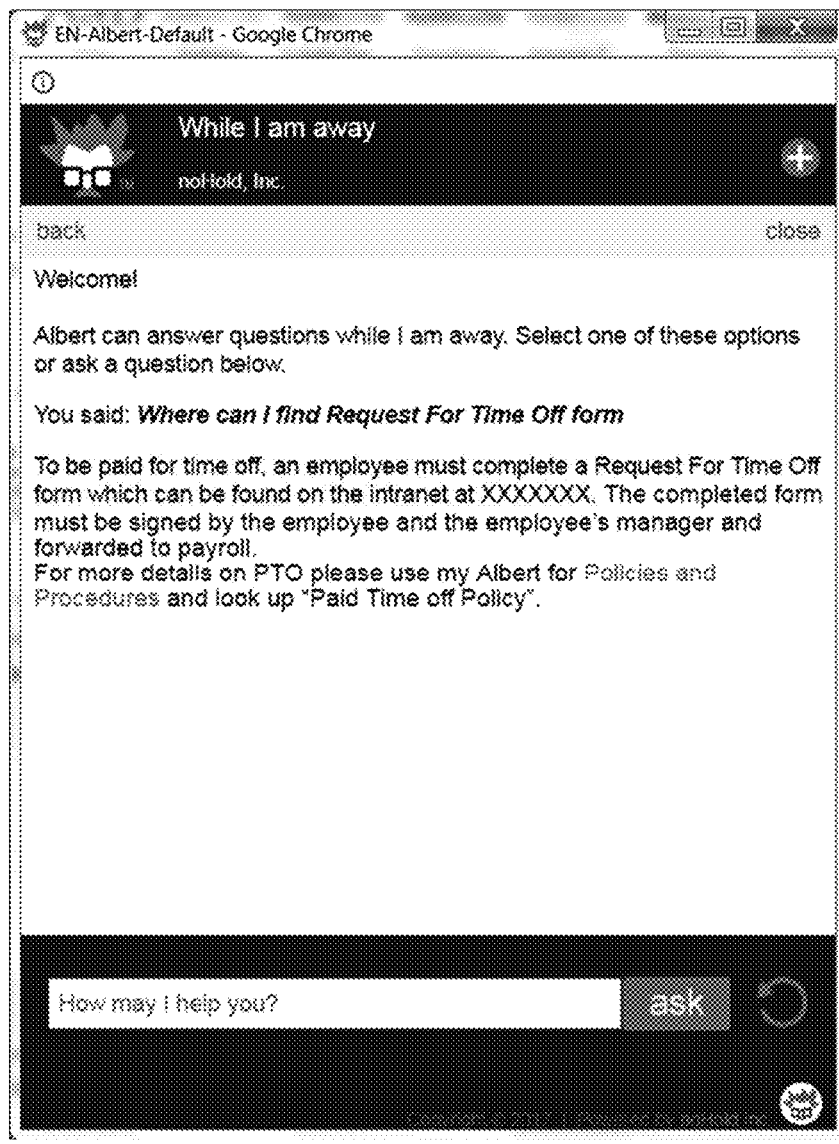
FIG. 6 is an example interactive conversational interface generated according to the present disclosure.

In some embodiments, the conversion module 108 is configured to convert topics or elements identified in the plaintext document and generate digital signatures that represent these topics or elements. The conversion of elements of a document into digital signatures allows for quick and efficient identification and retrieval of content from the digital document in response to a query (or set of queries) from an end user. This advantage allows the VA to respond traverse the diagnostic tree in an efficient manner and retrieve relevant portions of a document in an efficient manner. That is, the diagnostic tree is utilized as a map by the VA to obtain textual content from the digital document in response to a query. Thus, the diagnostic tree provides a map or linkage between these digital signatures and the parts of the textual content from which the digital signatures were generated. An example digital signature generation process is illustrated in FIGS. 4-6.

Once the diagnostic tree has been generated, the system can instantiate a VA or other interactive virtual interface. The interface or VA can incorporate, for example, an avatar that responds to natural language queries with natural language responses. In other embodiments, the responses are textual in nature or a combination between textual content and an audible natural language response.

The system 100 is configured to automatically instantiate a VA upon the conversion process completion. The VA is associated with the converted diagnostic tree and its corresponding digital document(s), as well as any third-party resources that could be utilized to respond to a query. By way of example, a query about vehicle maintenance that is dependent upon current ambient temperature could be answered by obtaining relevant information from both a user manual for a vehicle and subsequently obtaining ambient temperature data from a third-party resource, such as a weather service.

The platform can do this in multiple languages, through multiple channels and on multiple type devices.

As noted above in some embodiments, the system 100 is configured to track usage metrics of a VA and implement aspects of machine learning in order to improve the accuracy of the VA. For example, the system 100 can track queries and responses and determine if the responses are accurate based on the content included in the digital document (and diagnostic tree) leveraged to respond to the query. In some embodiments, the system 100 will learn syntactic differences in queries and account for discrepancies in natural language queries. For example, end users may ask the exact same question but utilize different phraseology for posing their queries. Because the system utilizes natural language processing of queries, the system can learn over time that these discrepant phrases are all related to a request for the same information, allowing the system to reduce response times. The system can capture different kinds of metrics to improve its performance. In one case, adaptive learning, the system learns through usage that when the VA asks a confirming question about a particular topic, 99.9% of the time end users answer always in the same way. After a certain number of dialogues the VA will no longer ask that confirming question and assume the answer in an attempt to streamline the conversation. Metrics can also be used to identify knowledge gaps, meaning questions the VA cannot answer simply because the content for that answer is not available in the source document. The system groups and reports these knowledge gaps, so that the administrator of the system has an option to fill in the gaps by adding appropriate content.

In sum, these features allow the system to process and identify queries directed to the same topic, but where the queries are stated using different expressions. The system will perform syntactic learning so as to return the same digital signatures for these queries having different expressions.

Figure 2:
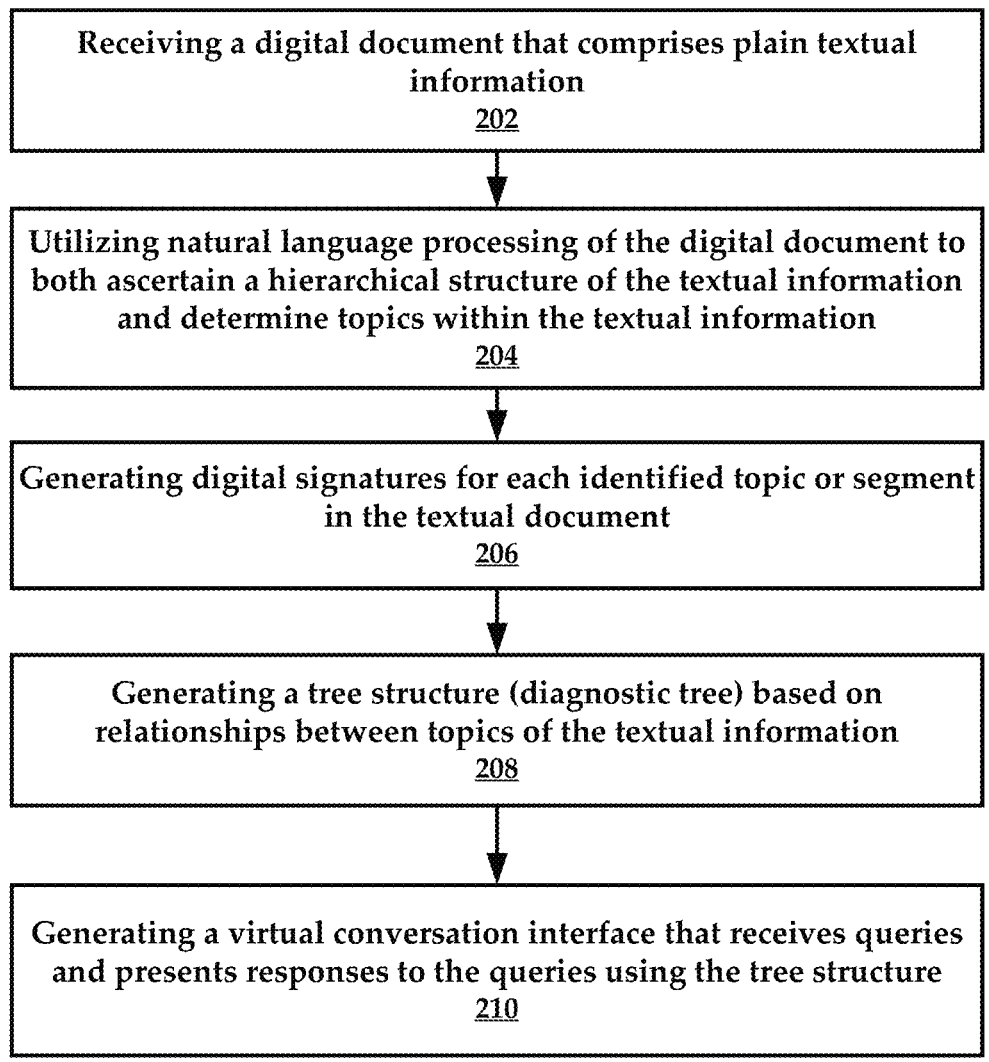
FIG. 2 is a flowchart of an example method of the present disclosure related to generating an interactive conversational interface.

FIG. 2 is a flow diagram of an example method for converting a digital document into an interactive virtual conversation interface. The method, in some embodiments, comprises a step 202 of receiving a digital document that comprises plain textual information. For example, the document could be an unstructured textual document.

The method further comprises a step 204 of utilizing natural language processing of the digital document to both ascertain a hierarchical structure of the textual information and determine topics within the textual information. These topics are related to, for example, segments of the document such as paragraphs, headers, footnotes, quotes, or other segments of the document. Once these features of the document are identified, the method can include step 206 of generating digital signatures for each identified topic or segment in the textual document.

After generating the digital signatures, the method can include a step 208 of generating a tree structure (diagnostic tree) based on relationships between topics of the textual information. To be sure, the topics are arranged into the tree structure in either vertical and/or horizontal relationships. Again, an example digital signature generation process is illustrated in FIGS. 4-6.

In an example embodiment, the digital signatures are arranged into the diagnostic tree based on the relative relationships between the textual content of the document that was used to generate the digital signatures. That is, digital signatures represent their associated textual content within the diagnostic tree, and the diagnostic tree is a hierarchical representation of the document itself.

Once the diagnostic tree is generated, the method includes a step 210 of generating a virtual conversation interface that receives queries and presents responses to the queries using the tree structure.

In some embodiments, the type of natural language processing utilized is based on an attribute of the digital document. For example, if the attribute is that the document is structured according to a known XML structure or layout, the natural language processing utilized can be based on this known structure. In one example the layout of a document indicates that symbolic natural language processing should be utilized. In another example, if the attribute of the document is that the document is unstructured and includes plaintext, the natural language processing selected can include statistical natural language processing using, for example TD/IDF as noted above. Other types such as PDF, HTML, Word, RTF and other similar document formats can inform as to the specific segments or layout of a document.

Figure 3:
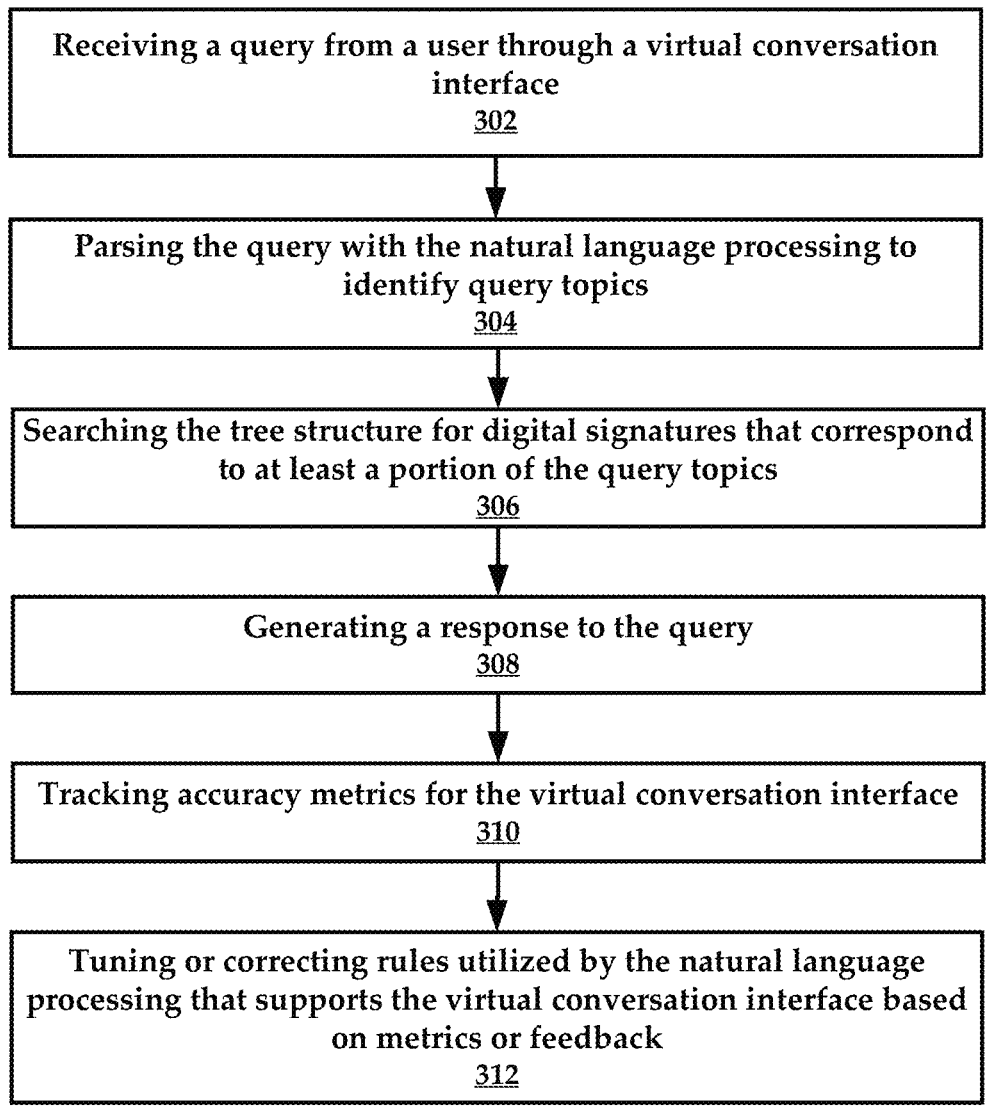
FIG. 3 is a flowchart of an example method of the present disclosure related to processing queries using an interactive conversational interface.

FIG. 3 is a flowchart of a method for operating an interactive virtual conversation interface of the present disclosure. The method includes a step 302 of receiving a query from a user through a virtual conversation interface. The method also includes a step 304 of parsing the query with the natural language processing to identify query topics. For example, in some embodiments, keywords or phrases are identified. These can be used to generally search for a tree structure that is likely to be relevant to a query. For example, if the query includes terms related to weather, the system can search for tree structures that correspond to weather.

Next, the method includes a step 306 of searching the tree structure for digital signatures that correspond to at least a portion of the query topics. Again, this is performed based on keywords and/or phrases in the query that can be searched against the tree structure. In some embodiments, matching with a specific node in the tree or a digital signature is accomplished by the use of a Natural language Processor (NLP) as described above. Several techniques are used that include, but are not limited to, morphing, spell checking, synonym dictionaries, syntactic and semantic analysis, so that the end user query does not have to match exactly the node or digital signature in memory, but be conceptually similar. For example if the node in the tree or a digital signature contains the information "the light is green", the VA will be able to match end users queries that look like this: "the LED is green" "the warning light is green", "green indicator", and so forth, just as an example.

In some embodiments, the method includes a step 308 of generating a response to the query. As noted above, the response comprises the textual information associated with the digital signatures that correspond to at least a portion of the query topics. Thus, the response is generated by locating digital signatures for the query. Because the digital signatures are linked to specific paragraphs or portions of one or more digital documents, the response is generated by obtaining these relevant paragraphs and presenting the same to the user as a response.

In some embodiments, the method includes a step 310 of tracking accuracy metrics for the virtual conversation interface. This can include determining how accurate the response is relative to the query and can be based on user feedback. Inaccurate responses can be used as a basis for tuning or correcting the rules utilized by the natural language processing employed by the conversion module (see FIG. 1) when parsing queries, generating responses, and so forth.

The method can also include a step 312 of tuning or correcting rules utilized by the natural language processing that supports the virtual conversation interface based on metrics or feedback. For example, it is assumed that the digital document contains information about a process to run when the "LED is green" and that the end users types "The light is green". Most likely for the first 100 times (just as an example) the VA will ask a confirming question like "Do you mean to say that the LED is green? Y/N" if for 99 times the end user answers "Yes", the system will learn that "light" and "LED" in this context are the same and will not ask that confirming question again.

FIG. 4 illustrates an example document that relates to information regarding paid time off (PTO) for a company. The document 400 includes headings 402 and 404, as well as textual content in paragraph form 406 and 408. In one embodiment, one of the sentences in the document 400 reads: "a Request For Time Off form which can be found on the intranet at XXXXXXX".

When the system ingests the document it creates digital signatures for each sentence in the document. The system labels each signature with a unique ID that is used for identification purposes. An example signature 500 for the above sentence is illustrated in FIG. 5.

Some words are recognized as keywords such as "paid", "time", and "employee". The words may look incomplete like "employee", but this is due to the fact that the algorithm utilized by the system operates on stems or roots of a word. The numbers by the keywords (i.e. "08") are values used by the system to determine the importance of a word. In the "<parsetree>" section of the signature the system stores additional information about the sentence, such as the role of each word within the sentence (e.g., verb, and adjective, etc.). This collection of information is used by the system to match a query of the end user with the content in the document. In the example the end user asks "Where can I find Request For Time Off form?". The VA generated based on the document of FIG. 4 then finds and highlights an appropriate solution based on the signature of that phrase stored in its memory. An example interactive interface 600 with query and response are illustrated in FIG. 6.

Figure 7:
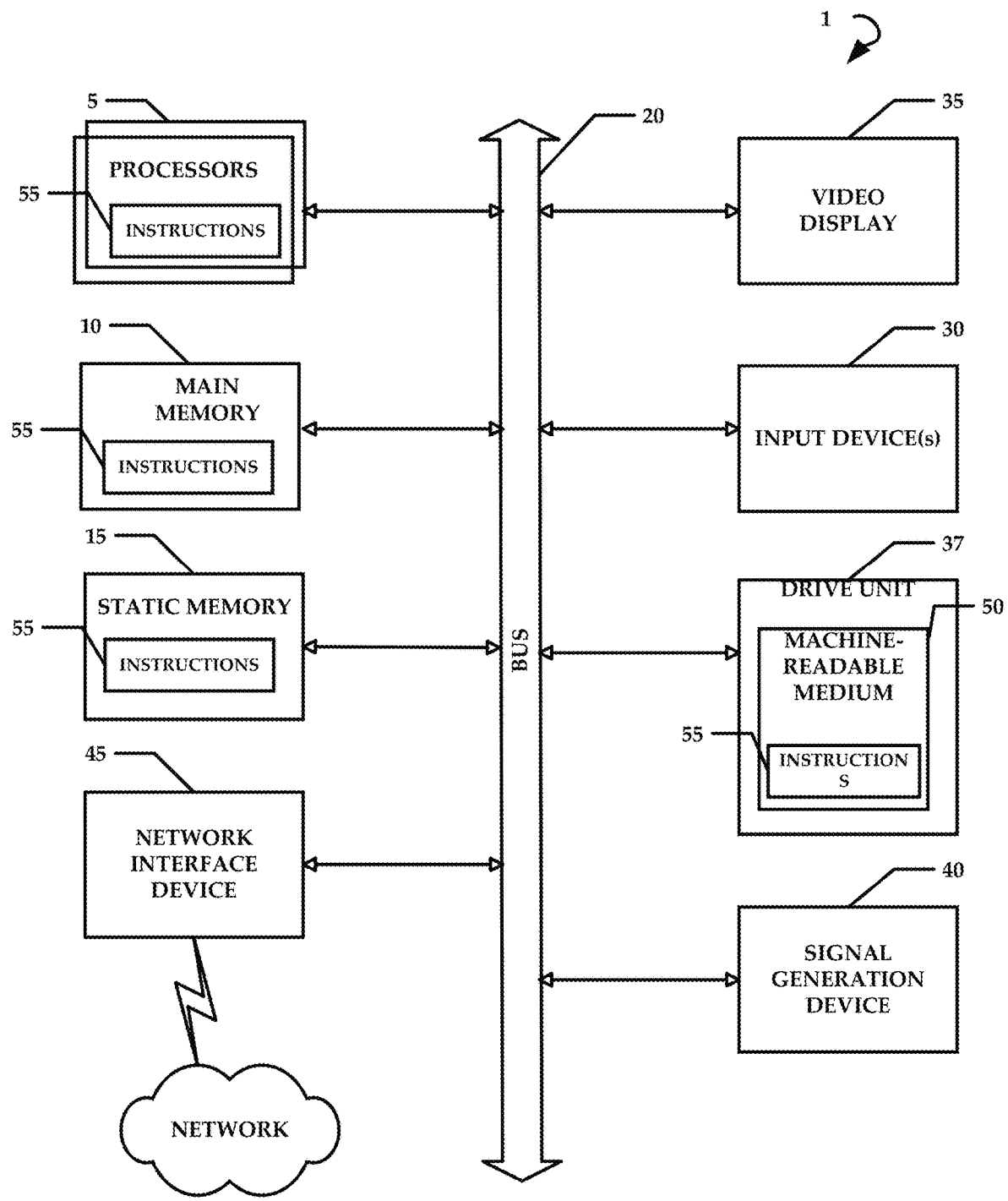
FIG. 7 illustrates an exemplary computing system that may be used to implement embodiments according to the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for generating a virtual conversation interface, the method comprising:
   receiving a digital document that comprises plain textual information;
      ascertaining a hierarchical structure of the plain textual information;
      determining topics within the plain textual information;
   generating a tree structure based on relationships between the topics of the plain textual information, the topics being arranged into the tree structure according to the hierarchical structure;
   generating a virtual conversation interface that receives queries and presents responses to the queries using the tree structure, the virtual conversation interface comprising an avatar that responds to natural language queries with natural language responses;
   generating a response to a query by the avatar by traversing the hierarchical structure and identifying query topics that match a portion of the hierarchical structure;
   displaying the virtual conversation interface comprising the avatar as a graphical user interface; and
   providing the response through the virtual conversation interface, the response comprising the avatar and the plain textual information associated with the portion of the hierarchical structure that matched the query.

2. The method according to claim 1, further comprising generating digital signatures for the topics, wherein the tree structure comprises the digital signatures.

3. The method according to claim 2, wherein the hierarchical structure of the digital document is based on a layout of the digital document.

4. The method according to claim 3, further comprising performing backward and forward chaining of the digital signatures within the hierarchical structure, the backward and forward chaining allowing for dialogue with a user, where the responses are generated based on successive queries about a same topic or related topics.

5. The method according to claim 1, further comprising:
   receiving a query from a user through the virtual conversation interface;
   parsing the query with natural language processing to identify query topics;
   searching the tree structure for digital signatures that correspond to at least a portion of the query topics; and
   generating a response to the query, the response comprising the plain textual information associated with the digital signatures that correspond to at least the portion of the query topics.

6. The method according to claim 5, wherein if the queries are directed to a same topic, but the queries are stated using different expressions, the method further comprises performing syntactic learning so as to return a same digital signature of the digital signatures for these queries having different expressions.

7. The method according to claim 1, wherein a type of natural language processing utilized is based on an attribute of the digital document.

8. The method according to claim 1, wherein the response is generated using third party data obtained from third party data sources, in addition to the digital document.

9. The method according to claim 1, wherein the digital document is an unstructured document, and natural language processing utilized is statistical.

10. The method according to claim 1, wherein the digital document is a structured document, and natural language processing utilized is symbolic.

11. A system for generating an interactive virtual conversation interface, the system comprising:
   a processor; and
   a memory for storing executable instructions, the processor executing the instructions to:
   generate an interactive virtual conversation interface by:
      receiving a digital document that comprises plain textual information;
         ascertaining a hierarchical structure of the plain textual information;
         determining topics within the plain textual information; and
      generating a tree structure based on relationships between the topics of the plain textual information, the topics being arranged into the tree structure according to the hierarchical structure;
   provide the interactive virtual conversation interface that:
      receives queries; and
      presents responses to the queries using the tree structure, the interactive virtual conversation interface comprising an avatar that responds to natural language queries with natural language responses;
      generate a response to a query by the avatar by traversing the hierarchical structure and identifying query topics that match a portion of the hierarchical structure;
   display the interactive virtual conversation interface comprising the avatar via a graphical user interface; and
   provide the response through the interactive virtual conversation interface, the response comprising the avatar and the plain textual information associated with the portion of the hierarchical structure that matched the query.

12. The system according to claim 11, wherein the processor further executes the instructions to generate digital signatures for the topics, wherein the tree structure comprises the digital signatures.

13. The system according to claim 12, wherein the hierarchical structure comprises a layout of the digital document.

14. The system according to claim 13, wherein the processor further executes the instructions to perform backward and forward chaining of the digital signatures within the hierarchical structure, the backward and forward chaining allowing for dialogue with a user, where the responses are generated based on successive queries about a same topic.

15. The system according to claim 11, wherein the processor further executes the instructions to:
receive a query from a user through the interactive virtual conversation interface;
parse the query with natural language processing to identify query topics;
search the tree structure for digital signatures that correspond to at least a portion of the query topics; and
generate a response to the query, the response comprising the plain textual information associated with the digital signatures that correspond to the at least a portion of the query topics.

16. The system according to claim 15, wherein if the queries are directed to a same topic, but the queries are stated using different expressions, the processor further executes the instructions to perform syntactic learning so as to return a same digital signature of digital signatures for these queries having different expressions.

17. The system according to claim 11, wherein the response is generated using third party data obtained from third party data sources, in addition to the digital document.

18. The system according to claim 11, wherein the processor further executes the instructions to utilize statistical natural language processing when the digital document is an unstructured document.

19. The system according to claim 11, wherein the processor further executes the instructions to utilize symbolic natural language processing when the digital document is a structured document.

20. A non-transitory computer readable medium having embodied thereon instructions being executable by at least one processor to perform a method for generating a virtual conversation interface, the method comprising:
receiving a digital document that comprises plain textual information;
ascertaining a hierarchical structure of the plain textual information;
determining topics within the plain textual information;
generating a tree structure based on relationships between topics of the plain textual information, the topics being arranged into the tree structure according to the hierarchical structure;
generating a virtual conversation interface that receives queries and presents responses to the queries using the tree structure, the virtual conversation interface comprising an avatar that responds to natural language queries with natural language responses;
generating a response to a query by the avatar by traversing the hierarchical structure and identifying query topics that match a portion of the hierarchical structure;
displaying the virtual conversation interface comprising the avatar as a graphical user interface; and
providing the response through the virtual conversation interface, the response comprising the avatar and the plain textual information associated with the portion of the hierarchical structure that matched the query.

* * * * *